(12) United States Patent
Schroeter

(10) Patent No.: US 7,584,104 B2
(45) Date of Patent: Sep. 1, 2009

(54) METHOD AND SYSTEM FOR TRAINING A TEXT-TO-SPEECH SYNTHESIS SYSTEM USING A DOMAIN-SPECIFIC SPEECH DATABASE

(75) Inventor: Horst Juergen Schroeter, New Providence, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 438 days.

(21) Appl. No.: 11/530,258

(22) Filed: Sep. 8, 2006

(65) Prior Publication Data

US 2008/0065383 A1 Mar. 13, 2008

(51) Int. Cl.
*G10L 13/00* (2006.01)

(52) U.S. Cl. .................. 704/258; 704/260; 704/266

(58) Field of Classification Search .................. 704/258, 704/268, 260, 266, 270, 271
See application file for complete search history.

(56) References Cited

U.S. PATENT DOCUMENTS 6,253,182 B1 * 6/2001 Acero ........................ 704/268
6,978,239 B2 * 12/2005 Chu et al. .................... 704/258

* cited by examiner

*Primary Examiner*—Huyen X. Vo

(57) ABSTRACT

A system, method and computer readable medium that trains a text-to-speech synthesis system for use in speech synthesis is disclosed. The method may include recording audio files of one or more live voices speaking language used in a specific domain, the audio files being recorded using various prosodies, storing the recorded audio files in a speech database; and training a text-to-speech synthesis system using the speech database, wherein the text-to-speech synthesis system selects audio selects audio segments having a prosody based on at least one dialog state and one speech act.

20 Claims, 4 Drawing Sheets with the TTS system 150 using the domain-specific speech knowledge module 160 and the speech database 170, for example.

METHOD AND SYSTEM FOR TRAINING A TEXT-TO-SPEECH SYNTHESIS SYSTEM USING A DOMAIN-SPECIFIC SPEECH DATABASE

BACKGROUND OF THE INVENTION

1. Field of the Invention

The present invention relates to a method and system for training a text-to-speech synthesis system for use in speech synthesis.

2. Introduction

Text-to-Speech (TTS) synthesis is the vehicle used to convert given text to intelligible and natural sounding speech so as to transmit information from a machine to a person. In conventional call center scenarios, TTS is only being used when and if voice talent recordings are highly impractical (e.g., address read-back) and/or too expensive (e.g., email reading in a unified messaging scenario). In all of these call-center applications, TTS voice quality (the naturalness and the intelligibility of the spoken messages) is of utmost importance. However, the resulting TTS quality for rendering conventional voice prompts and communications has been unsatisfactory.

SUMMARY OF THE INVENTION

A system, method and computer readable medium that trains a text-to-speech synthesis system for use in speech synthesis is disclosed. The method may include recording audio files of one or more live voices speaking language used in a specific domain, the audio files being recorded using various prosodies, storing the recorded audio files in a speech database; and training a text-to-speech synthesis system using the speech database, wherein the text-to-speech synthesis system selects audio selects audio segments having a prosody based on at least one dialog state and one speech act.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a system, method, computer-readable medium, and other embodiments that relate to the basic concepts of the invention.

This invention concerns improving the quality of Text-to-Speech (TTS) synthesis systems. In currently available automated voice services, TTS is used for rendering addresses or other dynamic information. For next-generation services that perform much more complex transactions than currently available while aiming at simplifying the user experience, TTS has to provide the majority of the voice feedback to customers. Consequently, TTS may have to be adapted to the specific application which may require for TTS to be of extremely high quality (e.g., sound like a live agent). In order to approximate this goal, TTS voices need to be created with the specific application in mind (i.e., special domain voices), trained from speech data obtained from live agents performing similar tasks, and be very expressive and life-like. In addition, a richer interface between the dialog manager and the TTS system must provide the information that allows such a TTS system to deliver much higher quality than is currently available from any off-the-shelf TTS engine.

A "special domain" TTS voice is basically a collection of reusable voice talent recordings that contain as many actual application voice prompts as practically possible. In addition, for linguistic coverage purposes (e.g., for synthesizing any of the many millions of names of people or products), there is a base corpus of about 10 hours of recordings that a voice talent has to do for use in TTS. In conventional TTS systems, the application-specific voice prompts are not restricting at all what the TTS can say. However, the general trend is that the resulting TTS quality is higher the closer the input text is to the speech recorded for the TTS voice database.

Figure 1:
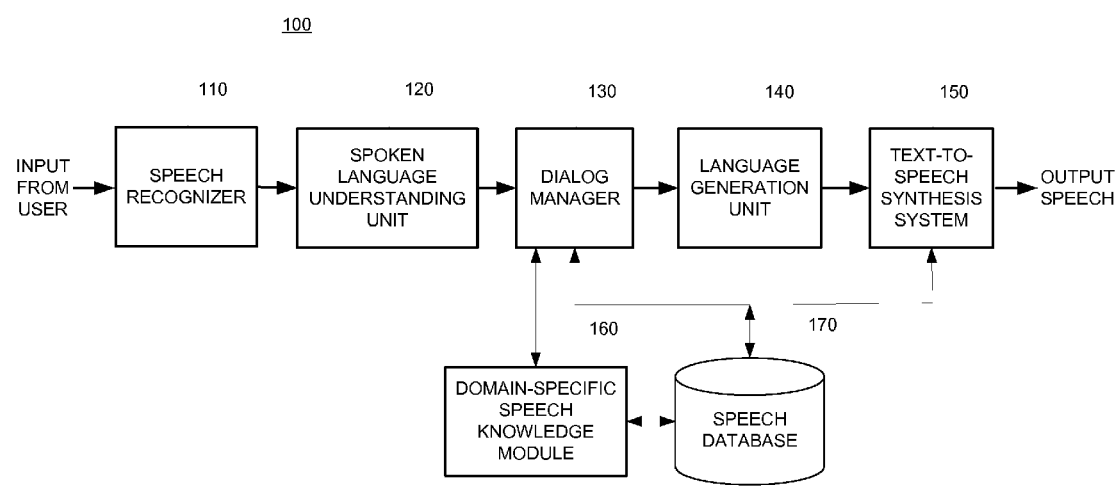
FIG. 1 illustrates an exemplary diagram of a dialog management system in accordance with a possible embodiment of the invention.

FIG. 1 illustrates an exemplary diagram of an automated dialog system 100 in accordance with a possible embodiment of the invention. In particular, the automated dialog system 100 includes speech recognizer (ASR) 110, spoken language understanding unit (SLU) 120, dialog manager (DM) 130, language generation unit (LGU) 140, text-to-speech synthesis (TTS) system 150, domain-specific speech knowledge module 160, and speech database 170.

The ASR 110 receives speech from a user. The SLU 120 receives text from the ASR 110 and identifies a meaning or intent in the speech. The DM 130 receives the user intent and determines the substance of a response to the user. The LGU 140 generates the text of the response to the user and transmits the text to the TTS system 150 that generates the spoken response that the user hears. The invention relates to training the TTS system 150 and to the process of creating voices used by the TTS system 150 to speak to the user.

TTS system 150 represents any speech synthesizer known to one of skilled in the art which can perform the functions of the invention disclosed herein or the equivalence thereof. In its simplest form, the TTS system 150 takes text input from a user in several forms, including keyboard entry, scanned in text, or audio, such as in a foreign language which has been processed through a translation module, etc. The TTS system 150 then converts the input text to a speech output using inputs from the speech database 170, as set forth in detail below.

Figure 2:
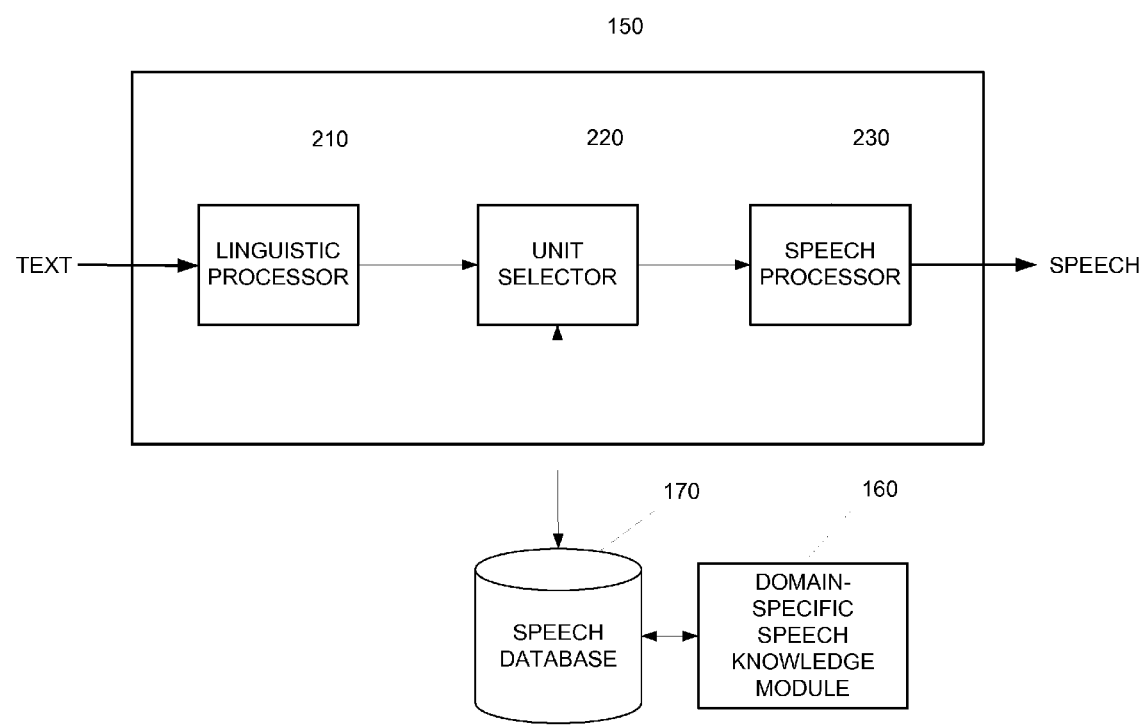
FIG. 2 illustrates an exemplary block diagram of an exemplary text-to-speech synthesis system utilizing the domain-specific speech knowledge module in accordance with a possible embodiment of the invention.

FIG. 2 shows a more detailed exemplary block diagram of the TTS system 150 of FIG. 1. The TTS system 150 includes linguistic processor 210, unit selector 220 and speech processor 230. The unit selector 220 is connected to the speech database 170 which is connected to the domain-specific speech knowledge module 160. The speech database 170 may be hosted on any memory device internal or external to the TTS system 150 and the domain-specific speech knowledge module 160. The speech database 170 may contain raw speech in digital format, an index which lists speech segments (syllables, phones, half-phones, diphones, triphones, phonemes, half-phonemes, etc.) in ASCII, for example, along with their associated start times and end times as reference information, and derived linguistic information, such as stress, accent, parts-of-speech (POS), etc.

Text is input to the linguistic processor 210 where the input text may be normalized, syntactically parsed, mapped into an appropriate string of phonemes, for example, and assigned a duration and intonation pattern. The string of phonemes is then sent to unit selector 220. The unit selector 220 picks candidates for requested speech segment sequence with speech segments, such as syllables, phones, half-phones, diphones, triphones, phonemes, half-phonemes, etc., for example, from the speech database 170 based on dialog state and speech act. The unit selector 220 then selects and outputs the "best" sequence to the speech processor 230. The speech processor 230 processes the selected sequence into synthesized speech and outputs the speech to the user.

Figure 3:
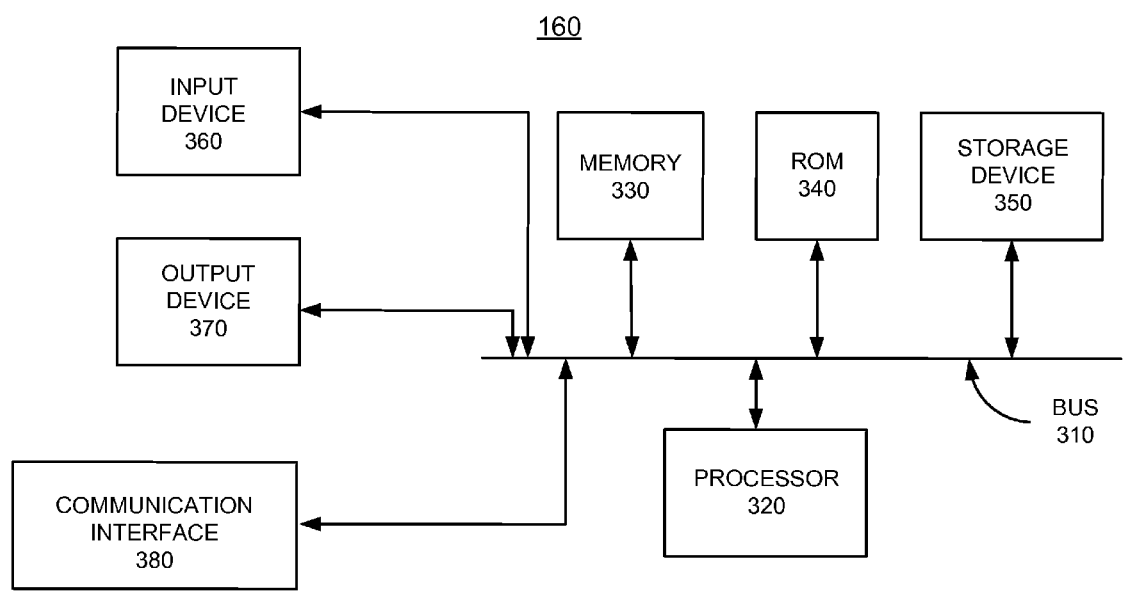
FIG. 3 illustrates an exemplary block diagram of a processing device for implementing the domain-specific speech knowledge process in accordance with a possible embodiment of the invention.
Figure 4:
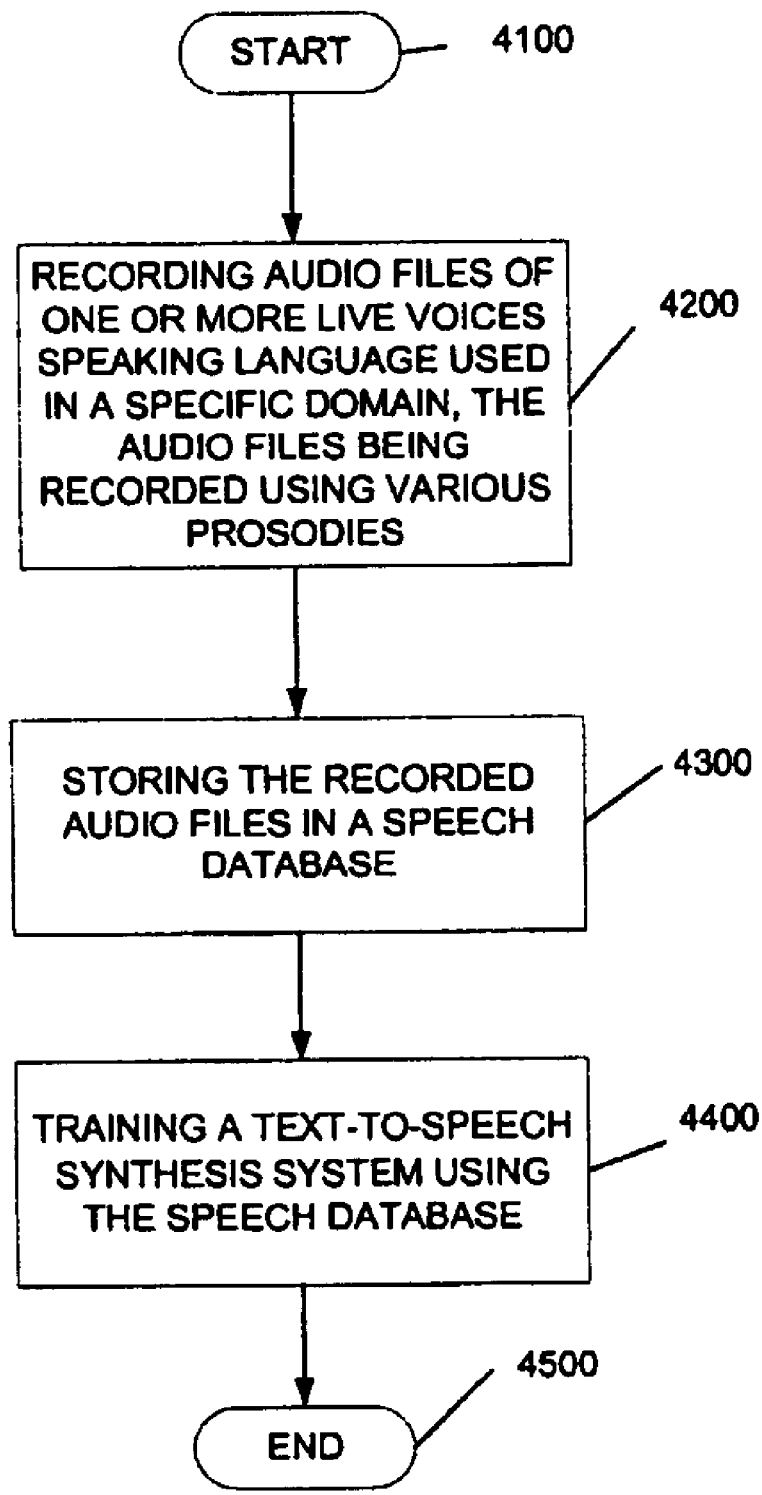
FIG. 4 illustrates an exemplary flowchart illustrating one possible domain-specific speech knowledge process in accordance with one possible embodiment of the invention.

FIG. 3 illustrates an exemplary domain-specific speech knowledge module 160, or device which may implement one or more modules or functions of the domain-specific speech knowledge process shown in FIGS. 4. Thus, exemplary domain-specific speech knowledge module 160 may include a bus 310, a processor 320, a memory 330, a read only memory (ROM) 340, a storage device 350, an input device 360, an output device 370, and a communication interface 380. Bus 310 may permit communication among the components of the domain-specific speech knowledge module 160.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Storage device 350 may include any type of media, such as, for example, magnetic or optical recording media and its corresponding drive.

Input device 360 may include one or more conventional mechanisms that permit a user to input information to the domain-specific speech knowledge module 160, such as a keyboard, a mouse, a pen, a voice recognition device, etc. Output device 370 may include one or more conventional mechanisms that output information to the user, including a display, a printer, one or more speakers, or a medium, such as a memory, or a magnetic or optical disk and a corresponding disk drive. Communication interface 380 may include any transceiver-like mechanism that enables the domain-specific speech knowledge module 160 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. In some implementations of the network environment 100, communication interface 380 may not be included in exemplary domain-specific speech knowledge module 160 when the domain-specific speech knowledge process is implemented completely within a domain-specific speech knowledge module 160.

The domain-specific speech knowledge module 160 may perform such functions in response to processor 320 by executing sequences of instructions contained in a computer-readable medium, such as, for example, memory 330, a magnetic disk, or an optical disk. Such instructions may be read into memory 330 from another computer-readable medium, such as storage device 350, or from a separate device via communication interface 380.

The dialog management system 100 and the domain-specific speech knowledge module 160 illustrated in FIG. 1 and the related discussion are intended to provide a brief, general description of a suitable computing environment in which the invention may be implemented. Although not required, the invention will be described, at least in part, in the general context of computer-executable instructions, such as program modules, being executed by the domain-specific speech knowledge module 160, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

For illustrative purposes, the domain-specific speech knowledge process will be described below in relation to the block diagrams shown in FIGS. 1, 2 and 3.

FIG. 4 is an exemplary flowchart illustrating some of the basic steps associated with a domain-specific speech knowledge process in accordance with a possible embodiment of the invention. The process begins at step 4100 and continues to step 4200 where the domain-specific speech knowledge module 160 records audio files of one or more live voices speaking language used in a specific domain. The audio files are recorded using various prosodies to cover all possible dialog states and speech acts.

With respect to prosody, since the TTS system 150 mimics the voice of a live agent, there are several different ways how any specific sentence may be spoken. A live agent would adapt the prosody or melody of his or her voice to reflect the state of the dialog/transaction with the customer. A friendly greeting certainly requires a different voice tone than a somewhat apologetic statement just before addressing a problem that a customer might have raised. Thus, the domain-specific speech knowledge module 160 may record the audio files from voice talent recording various words, phrases, sentences, etc. rendered using emotions such as "happy," "sad," "concerned," or "friendly," or "indifferent" voice, for example.

At step 4300, the domain-specific speech knowledge module 160 stores the recorded audio files in the speech database 170. In this manner, the domain-specific speech knowledge module 160 may tag the audio files for storage based on their prosody, for example. In addition, the audio files may be tagged for dialog state and speech act. At step 4400, the domain-specific speech knowledge module 160 trains the TTS system 150 using the speech database 150 Therefore, the unit selector 220 of the TTS system 150 may select audio segments from respective audio files having an appropriate prosody based on a given dialog state and a speech act. The dialog state may be the beginning (e.g, greeting), the middle (e.g, gathering customer account information), or the end or closing of the dialog (transfer to an agent/transition to another sub-system for further processing/end the call by thanking the caller and hanging up) for example. The speech act may concern the content of what is trying to be conveyed such as a greeting, an apology, thanks, a request for information, a question, a confirmation, etc. Therefore, speech database 170 used by he TTS system 150 can provide close coverage of the specific domain (i.e., airline reservations, customer care, etc.) not only by content, but how that content is spoken (i.e., prosody, speech acts, emotion, etc.). The process goes to step 4500 and ends.

The maintenance required for TTS would be to feed back any usage logs with text synthesized to a group that would fine-tune the TTS system for maximum quality in a bootstrapping fashion. Over time, less and less maintenance would be required as quality improves. Knowledge and data gained in the process could be leveraged for future TTS voices specialized for other applications.

The points touched upon herein have a profound impact on the required steps towards improving the existing TTS systems 150 that delivers the necessary service quality. Depending on the exact state of the dialog between customer and dialog system, the TTS system needs to be given information on how it should render its output. In this manner, the TTS system 150 can be made to sound much livelier, improving customer experience. This process may include special text mark-up and also side-channel information on discourse and semantics (e.g., what is important to emphasize and what should not receive emphasis). As a result, the automated dialog system 100 that employs TTS system 150 will be perceived as being more responsive by the listener.

The speech database 170 used within the TTS system needs to provide close coverage of the application domain, not only in what it contains (e.g., sentences), but also how the individual sentences are spoken (i.e., prosody, speech acts, emotions). High-quality recordings of at least one live agent working customer requests in a chosen specific application (e.g., bank customer care) may be beneficial as a TTS-specific speech data mining effort. Contrary to data collection in speech recognition where one would like to mine a limited number of sentences from each of many users, this approach would prefer to harvest many sentences (taking weeks of work) of one or just a few call center agents. The speech of the entire dialog between agent and customers may be fully transcribed so the customer portions could also be used for speech recognition training, for example. In case the resulting recordings are of poor quality (e.g., because of background noise such as competing speech from other agents), the same content may be recreated by one or more agents with voice talents in a quiet recording studio. Each sentence may be played to the talent so that he/she can speak it in exactly the same way.

As a result, the TTS system 150 can achieve excellent service quality without using fixed voice prompts. Therefore, unlike a general off-the-shelf TTS, the domain-specific speech knowledge module 160 trains the TTS system 150 on the special application domain, (e.g., bank customer care, etc.). Then, the domain-specific speech knowledge module 160 updates and maintains the speech database 170 in much the same way the speech recognition and natural language components of the system are bootstrapped throughout the deployment phase of an automated dialog system. This process may include updates to correct pronunciations of named entities, expansions of new abbreviations and acronyms, etc.

The use of such TTS system 150 trained and maintained by the domain-specific speech knowledge module 160 allows for customization, that is, any caller could set a profile identifying his or her favorite persona (i.e., TTS voice) in a voice automated service. This profile could then be used for other services, resulting in a familiar voice for the specific user. Thus, the user's experience greatly improves for such services such as interactive voice response (IVR) systems and other automated services in use in the general public.

Embodiments within the scope of the present invention may also include computer-readable media for carrying or having computer-executable instructions or data structures stored thereon. Such computer-readable storage media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the domain-specific speech knowledge module 160 in FIGS. 1-3 each processing the content in various possible ways. It does not necessarily need to be one system used by all end users. Accordingly, the appended claims and their legal equivalents should only define the invention, rather than any specific examples given.

I claim:

1. A method for training a text-to-speech synthesis system, comprising:

recording audio files of one or more live voices speaking language used in a specific domain, the audio files being recorded using various prosodies;

storing the recorded audio files in a speech database; and training a text-to-speech synthesis system using the speech database, wherein the text-to-speech synthesis system selects audio segments having a prosody based on at least one dialog state and one speech act.

2. The method of claim 1, wherein the dialog state is one of a beginning, middle and end of a dialog.

3. The method of claim 1, wherein the speech act is based on at least one of syntax and semantics of a user's input.

4. The method of claim 1, wherein the text-to-speech synthesis system selects audio segments based on at least one of discourse and semantics.

5. The method of claim 1, further comprising:

updating the speech database using dialogs conducted with user's using the text-to-speech system.

6. The method of claim 1, wherein the text-to-speech synthesis system selects audio segments based on a user's profile.

7. The method of claim 1, further comprising:

tagging audio files based on prosody for storage in the speech database.

8. A computer-readable storage medium storing instructions for controlling a computing device for use in training a text-to-speech speech synthesis, the instructions comprising:

recording audio files of one or more live voices speaking language used in a specific domain, the audio files being recorded using various prosodies;

storing the recorded audio files in a speech database; and training a text-to-speech synthesis system using the speech database, wherein the text-to-speech synthesis system selects audio segments having a prosody based on at least one dialog state and one speech act.

9. The computer-readable storage medium of claim 8, wherein the dialog state is one of a beginning, middle and end of a dialog.

10. The computer-readable storage medium of claim 8, wherein the speech act is based on at least one of syntax and semantics of a user's input.

11. The computer-readable storage medium of claim 8, wherein the text-to-speech synthesis system selects audio segments based on at least one of discourse and semantics.

12. The computer-readable storage medium of claim 8, further comprising:

updating the speech database using dialogs conducted with user's using the text-to-speech system.

13. The computer-readable storage medium of claim 8, wherein the text-to-speech synthesis system selects audio segments based on a user's profile.

14. The computer-readable storage medium of claim 8, further comprising:

tagging audio files based on prosody for storage in the speech database.

15. A text-to-speech synthesis training system, comprising:

a speech database; and a specific domain speech knowledge module that record audio files of one or more live voices speaking language used in a specific domain, the audio files being recorded using various prosodies, stores the recorded audio files in the speech database, and trains a text-to-speech synthesis system using the speech database, wherein the text-to-speech synthesis system selects audio segments having a prosody based on at least one dialog state and one speech act.

16. The system of claim 15, wherein the dialog state is one of a beginning, middle and end of a dialog.

17. The system of claim 15, wherein the speech act is based on at least one of syntax and semantics of a user's input.

18. The system of claim 15, wherein the text-to-speech synthesis system selects audio files based on at least one of discourse and semantics.

19. The system of claim 15, wherein the specific domain speech knowledge module updates the speech database using dialogs conducted with user's using the text-to-speech system.

20. The system of claim 15, wherein the text-to-speech synthesis system selects audio segments based on a user's profile.

* * * * *